United States Patent
Satapati et al.

(10) Patent No.: US 7,814,232 B2
(45) Date of Patent: Oct. 12, 2010

(54) NETWORK ADDRESS TRANSLATION WITH GATEWAY LOAD DISTRIBUTION

(75) Inventors: Suresh Satapati, Sunnyvale, CA (US);
Ian Herbert Wilson, Edinburgh (GB);
Douglas McLaggan, Edinburgh (GB)

(73) Assignee: Cisco Technology, Inc., San Jose, CA (US)

( * ) Notice: Subject to any disclaimer, the term of this patent is extended or adjusted under 35 U.S.C. 154(b) by 794 days.

(21) Appl. No.: 10/401,902

(22) Filed: Mar. 28, 2003

(65) Prior Publication Data

US 2004/0215752 A1    Oct. 28, 2004

(51) Int. Cl.
*G06F 15/16* (2006.01)

(52) U.S. Cl. ........................... 709/249; 709/226

(58) Field of Classification Search ............. 709/223, 709/226, 238, 239, 242, 245
See application file for complete search history.

(56) References Cited

U.S. PATENT DOCUMENTS

| | | | |
|---|---|---|---|
| 5,414,704 A | 5/1995 | Spinney | 370/60 |
| 5,473,599 A | 12/1995 | Li et al. | |
| 5,488,412 A | 1/1996 | Majeti et al. | 348/10 |
| 5,506,987 A | 4/1996 | Abramson et al. | 395/650 |
| 5,586,121 A | 12/1996 | Moura et al. | 370/404 |
| RE35,774 E | 4/1998 | Moura et al. | 348/12 |
| 5,818,845 A | 10/1998 | Moura et al. | 370/449 |
| 5,828,655 A | 10/1998 | Moura et al. | 370/236 |
| 5,859,852 A | 1/1999 | Moura et al. | 370/449 |
| 5,872,773 A | 2/1999 | Katzela et al. | 370/256 |
| 5,892,903 A | 4/1999 | Klaus | 395/187.01 |

(Continued)

FOREIGN PATENT DOCUMENTS

WO    WO98/31107    7/1998

(Continued)

OTHER PUBLICATIONS

Eager et al., "Adaptive Load Sharing in Homogeneous Distributed Systems," IEEE, Transactions on Software Engineering, vol. Se-12, No. 5, May 1986, pp. 662-675.

(Continued)

*Primary Examiner*—Salad Abdullahi
*Assistant Examiner*—El Hadji M Sall
(74) *Attorney, Agent, or Firm*—Weaver Austin Villeneuve & Sampson LLP

(57) ABSTRACT

Gateway and NAT services to a single host or large number of hosts on a local network using a redundancy group having gateway devices. A pool of unique IP addresses are partitioned into address blocks, one of which is assigned to a gateway device. Using the unique IP addresses in its assigned address block, the gateway device translates local IP addresses of hosts on a local network to unique IP addresses from the gateway device's assigned address block for host packets destined for outside networks and creates a mapping of the translation. The gateway device notifies other gateway devices in the redundancy group of the mapping. A master mapping database or a local mapping database is updated whenever one of the gateway devices performs a translation. In the event that one of the gateway devices ceases forwarding of outgoing packets for a host using the gateway device's virtual MAC address, that virtual MAC address is re-assigned to an operating gateway device in the redundancy group to permit continued forwarding of the host's packets destined for outside networks.

46 Claims, 7 Drawing Sheets

U.S. PATENT DOCUMENTS

| | | | |
|---|---|---|---|
| 5,946,047 A | 8/1999 | Levan | 348/473 |
| 5,946,048 A | 8/1999 | Levan | 348/473 |
| 5,950,205 A | 9/1999 | Aviani, Jr. | 707/103 |
| 5,953,335 A | 9/1999 | Erimli et al. | 370/390 |
| 5,956,346 A | 9/1999 | Levan | 370/480 |
| 5,959,660 A | 9/1999 | Levan | 348/12 |
| 5,959,968 A | 9/1999 | Chin et al. | 370/216 |
| 5,959,997 A | 9/1999 | Moura et al. | 370/404 |
| 5,989,060 A | 11/1999 | Coile et al. | 439/489 |
| 6,006,266 A | 12/1999 | Murphy, Jr. et al. | 709/227 |
| 6,016,388 A | 1/2000 | Dillon | 395/200.72 |
| 6,052,718 A | 4/2000 | Gifford | 709/219 |
| 6,295,276 B1 * | 9/2001 | Datta et al. | 370/218 |
| 6,345,294 B1 | 2/2002 | O'Toole et al. | 709/222 |
| 6,505,254 B1 | 1/2003 | Johnson et al. | 709/239 |
| 6,779,035 B1 * | 8/2004 | Gbadegesin | 709/228 |
| 6,779,039 B1 * | 8/2004 | Bommareddy et al. | 709/238 |
| 6,888,837 B1 * | 5/2005 | Cunningham et al. | 370/401 |
| 6,944,167 B1 * | 9/2005 | McPherson | 370/401 |
| 7,035,929 B2 * | 4/2006 | Agrawal et al. | 709/226 |
| 7,043,357 B1 * | 5/2006 | Stankoulov et al. | 701/200 |
| 7,305,489 B2 * | 12/2007 | Puthiyandyil et al. | 709/245 |

FOREIGN PATENT DOCUMENTS

WO      WO 02/35801 A1      5/2002

OTHER PUBLICATIONS

Akamai Technologies, Inc. -Global Internet Content Delivery-"How FreeFlow Works," webmaster@akamai.com 1999-2000.

Digital Island, Inc. -e-Business Without Limits-, "Enabling Technologies," http://www.digisle.net. No date.

Internap, "Preferred Collocation Services," http://www.internap.com Copyright © 2001 Internap Network Services Corporation.

D. Farinacci, et al., Request for Comments No. 2784, entitled, "Generic Routing Encapsulation (GRE)," Mar. 2000, Netweork Working Group, 9 pages.

Mockapetris, P., Request for Comments No. 1034, entitled, "Domain Names—Concepts and Facilities," Nov. 1987, Internet Engineering Task Force, 31 pages.

Information Sciences Institute, Request for Comments No. 793, entitled, "Transmission Control Protocol—DARPA Internet Program—Protocol Specification," Sep. 1981, Internet Engineering Task Force, 49 pages.

David M. Gifford, "Replica Routing," U.S. Appl. No. 09/472,964, filed Dec. 28, 1999, 37 pages.

Lu et al., "Automatic Network Addresses Assignment and Translation Interference," U.S. Appl. No. 60/160,535, filed Oct. 20, 1999, 127 pages.

Lu et al., "Method and Apparatus for Automatic Network Address Assignment," U.S. Appl. No. 60/178,063, filed Jan. 24, 2000, 74 Pages.

Johnson et al., "Method and Apparatus for Determining a Network Topology in the Presence of Network Address Translation," U.S. Appl. No. 60/178,062, filed Jan. 24, 2000, 32 Pages.

Toole et al., "Fast-Changing Network Status and Load Monitoring and Feedback," U.S. Appl. No. 60/177,985 filed Jan. 25, 2000, 20 Pages.

Kirk Johnson, "A Method and Apparatus for Minimalist Approach to Implementing Server Selection," U.S. Appl. No. 60/177,415, filed Jan. 21, 2000, 39 Pages.

Tsuchiya et al., "Extending the IP Internet Through Address Reuse" Computer Communication Review, Association for Computing Machinery. New York, vol. 1, No. 23, 1993, pp. 16-33.

Alex Manhenke, "Deploying High Availability at the Edge," Networkers 2002, Online, Oct. 21, 2002, pp. 96-101.

Srisuresh, P. et al., "IP Network Address Translator (NAT) Terminology and Considerations" IETF Internet Draft, Jun. 30, 1999, p. 14, chapter 4.4 Multihomed NAT.

Australian Office Action dated Aug. 6, 2008 from corresponding AU Application No. 2004225384, 2 pgs.

European Office Action dated Jun. 20, 2008 from corresponding EP Application No. 04758406.5, 5 pgs.

First Chinese Office Action dated Mar. 6, 2009 from Application No. 200480004960.X; 30 pgs.

Alex Manhenke, "Deploying High Availability at the Edge Session RTS-232", Networks 2002, publication date Oct. 21, 2002; pp. 96-101.

Paul F. Tsuchiya and Tony Eng, "Extending the IP Internet Through Address Reuse," Computer Communication Review, publication date Jan. 31, 1993; 18 pgs.

Canadian Office Action mailed May 13, 2009, from CA Application No. 2,515,462.

* cited by examiner

NETWORK ADDRESS TRANSLATION WITH GATEWAY LOAD DISTRIBUTION

BACKGROUND OF THE INVENTION

The present invention relates generally to network systems using redundant or standby devices working together in a redundancy group and load distributing arrangement to provide virtual router service. More particularly, the present invention relates to methods and apparatus for providing network address translation services while allowing the forwarding of packets using a load distributing virtual router.

Private and/or local networks are commonly connected to the Internet through one or more gateway devices (for example, routers) so that hosts (PCs or other arbitrary network entities) on the local network can communicate with nodes on the Internet. Typically, the host will send packets to locations identified using an address (for example, an Internet Protocol or "IP" address) both within its local network and on the Internet. To receive packets from the Internet, a local network or a host on that network must have a globally unique address. Typically, each such address uses a four octet format to generate a 32-bit IP address. These IP addresses often are presented in a dotted decimal format, with each octet written as a decimal integer separated from other octets by decimal points.

Global IP addresses have been issued to enterprises by a central authority known as the Internet Assigned Number Authority ("IANA"). The IANA has issued such addresses in one of three commonly used classes. Class A IP addresses employ their first octet as a "netid" and their remaining three octets as a "hostid." The netid identifies the enterprise network and the hostid identifies a particular host on that network. As three octets are available for specifying a host, an enterprise having class A addresses has $2^{24}$ (nearly 17 million) addresses at its disposal for use with possible hosts. Thus, even the largest companies vastly underuse available class A addresses. Not surprisingly, Class A addresses are issued to only very large entities. Class B addresses employ their first two octets to identify a network (the netid) and their second two octets to identify a host (the hostid). Thus, an enterprise having class B addresses can use those addresses on approximately 64,000 hosts. Finally, class C addresses employ their first three octets as a netid and their last octet as a hostid. Only 254 host addresses are available to enterprises having a single class C netid.

There has been a substantial proliferation of hosts on the Internet, coupled with so many class A and B licenses issued to large entities, that it is now nearly impossible to obtain a class B address. Many organizations now requiring Internet access have far more than 254 hosts—for which unique IP addresses are available with a single class C network address. It is more common for a mid to large size enterprise to have 1,000 to 10,000 hosts. Such companies simply can not obtain enough IP addresses for each of their hosts.

To address this problem, a Network Address Translation ("NAT") protocol has been developed. See K. Egevang and P. Francis, "The IP Network Address Translator (NAT)," Request For Comments "RFC" 1631, Cray Communications, NTT, May 1994 which is incorporated herein by reference for all purposes. NAT is based on the concept of address reuse by and within local networks, and operates by mapping reusable (also referred to as "local" or "private") IP addresses (see, RFC 1918, referenced and incorporated below) of a leaf or stub domain to globally unique addresses which are required for communication with hosts on the Internet. IP addresses used within local networks can be reusable, non-unique IP addresses, in accordance for example with RFC 1918, Y. Rekhter et al., "Address Allocation for Private Internets," Request For Comments "RFC" 1918, Cisco Systems et al., February 1996, which is incorporated herein by reference for all purposes.

In implementation, a local host wishing to access the Internet receives a temporary IP address from a pool of such addresses available to the enterprise (for example, 254 class C addresses). While the host is sending and receiving packets on the Internet, it has a global IP address which is unavailable to any other host. After the host disconnects from the Internet, the enterprise can take back the global IP address and make it available to other hosts wishing to access public networks or the Internet. Through NAT mappings, global IP addresses can be assigned to hosts using private IP addresses. These mappings can be maintained by routers or other gateway devices that separate the local network from a public network like the Internet. To implement a NAT, a translation system must be provided between the enterprise local network and the Internet (or other public network). For this reason, NAT services are implemented at gateway positions.

As noted above, local area networks (LANs) are commonly connected with one another through one or more routers so that a host (a PC or other arbitrary LAN entity) on one LAN can communicate with other hosts on different LANs. Typically, the host is able to communicate directly only with the entities on its local LAN segment. When it needs to send a data packet to an address that it does not recognize as being local, it communicates through a router (or other layer-3 or gateway device) which determines how to direct the packet between the host and the destination address in a remote network. Unfortunately, a router may, for a variety of reasons, become inoperative (for example, a power failure, rebooting, scheduled maintenance, etc.) creating a trigger event. Such potential router failure has led to the development and use of redundant systems, which have more than one router to provide a back up in the event of primary router failure. When a router fails in such a redundancy system, the host communicating through the inoperative router may still remain connected to other LANs by sending packets to another router connected to the host's LAN.

Logically, such a system can resemble FIG. 1A. In FIG. 1A, a local network 130 uses a single gateway 110 to forward outbound packets for hosts 120, 122, 124 when those packets are bound for an outside network 150 (for example, the Internet). As seen in FIG. 1B, however, the actual physical configuration of a redundancy group system 100 uses several routers 112, 114, 116, 118 to implement a redundancy group that functions as the single virtual gateway 110 for hosts 120, 122, 124.

Various protocols have been devised to allow a host to choose a router from among a group of routers in a network. Two of these, Routing Information Protocol (or RIP) and ICMP Router Discovery Protocol (IRDP) are examples of protocols that involve dynamic participation by the host. However, because both RIP and IRDP require that the host be dynamically involved in the router selection, performance may be reduced and special host modifications and management may be required.

In a widely used and somewhat simpler approach, the host recognizes only a single "default" router. Hosts (for example, workstations, users and/or data center servers) using the IP protocol utilize this default gateway to exit a local network and access remote networks. Therefore, each host must have prior knowledge of the gateway's IP address which typically is a router or layer-3 switch IP address. Hosts are either statically configured with the IP address of the default gateway or are assigned the address through a configuration protocol (such as Cisco's DHCP) upon boot-up. In either case, the host uses the same default gateway IP address for all network traffic destined to exit the local network.

To forward traffic to the default gateway, the host must perform an IP-ARP resolution to learn the data-link Media Access Control (MAC) address of the default gateway. The host sends an ARP inquiry to the IP address of the gateway, requesting the gateway's MAC address. The default gateway will respond to the host's ARP request by notifying the host of the gateway's MAC address. The host needs the default gateway's MAC address to forward network traffic to the gateway via a data-link layer transfer. When only a single gateway device is used, that device returns its own "burned in" (BIA) MAC address as the address for the host's outbound packets.

In this approach, the host is configured to send data packets to the default router when it needs to send packets to addresses outside its own LAN. It does not keep track of available routers or make decisions to switch to different routers. This requires very little effort on the host's part, but has a serious danger. If the default router fails, the host cannot send packets outside of its LAN. This may be true even though there may be a redundant router able to take over, because the host does not know about the backup. Unfortunately, such systems have been used in mission critical applications such as stock trading.

The shortcomings of these early systems led to the development and implementation of redundant gateway systems, which provide for failover in gateway settings. One such system is the hot standby router protocol (HSRP) by Cisco Systems, Inc. of San Jose, Calif. A more detailed discussion of the earlier systems and of an HSRP type of system can be found in U.S. Pat. No. 5,473,599 (referred to herein as "the '599 Patent"), entitled STANDBY ROUTER PROTOCOL, issued Dec. 5, 1995 to Cisco Systems, Inc., which is incorporated herein by reference in its entirety for all purposes. Also, HSRP is described in detail in RFC 2281, entitled "Cisco Hot Standby Router Protocol (HSRP)", by T. Li, B. Cole, P. Morton and D. Li, which is incorporated herein by reference in its entirety for all purposes.

HSRP is widely used to back up primary routers for a network segment. In HSRP, a "standby" router is designated as the backup to an "active" router. The standby router is linked to the network segment or segments serviced by the active router. The active and standby routers share a "virtual IP address" and possibly a "virtual Media Access Control (MAC) address" which is actually in use by only one router at a time. All internet communication from the relevant local network employs the virtual IP address (also referred to as a "vIP address") and the virtual MAC address (also referred to as a "vMAC address"). At any given time, the active router is the only router adopting and using the virtual address(es). Then, if the active router should cease operation for any reason, the standby router immediately takes over its load (by adopting the virtual addresses). This allows the host to always direct data packets to an operational router without monitoring the routers of the network.

One drawback to HSRP systems in general is that only one gateway device in a redundancy group is in use at any given time. To better utilize system resources in such redundancy systems, a gateway load balancing protocol (GLBP) was developed by Cisco and is the subject of commonly owned and copending U.S. Ser. No. 09/883,674 filed Jun. 18, 2001, entitled GATEWAY LOAD BALANCING PROTOCOL, which is incorporated herein by reference in its entirety for all purposes. The terms "load sharing" and "load distribution" and the like herein mean the ability to assign outgoing traffic to multiple gateway devices so that a single gateway device is not responsible for all outbound packets from all hosts on a LAN.

Like HSRP, for communications directed outside of a LAN, GLBP uses a virtual IP address shared by multiple gateway devices (for example, routers) in a redundancy group. These various routers share a common, virtual IP address (also referred to as a "vIP address"), but maintain actual IP addresses as well (also referred to as "aIP addresses"). Each gateway device also has its own BIA (actual) MAC address (also referred to herein as an "aMAC address) and a virtual MAC address (also referred to herein as a "vMAC address"). The use of vMAC addresses allows interchangeability of routers without the need for reprogramming of the system.

Each GLBP system has a "master" gateway device (also referred to herein as an "Active Virtual Gateway" or AVG device) in the redundancy group that controls address assignment (ARP responses) and failover features. The AVG instructs an ARPing host to address outgoing communications to a virtual MAC address assigned to one of the redundancy group gateway devices (gateway devices not functioning as a master device may be referred to as "standby" and/or "slave" gateway devices, in accordance with standard GLBP nomenclature and operation). Any gateway device that is forwarding packets is referred to herein as an "Active Virtual Forwarder" or AVF device. Each redundancy group therefore has one AVG device and one or more AVF devices.

More specifically, a host sends an ARP message to the redundancy group's virtual IP address when the host wants to send a packet outside the local network. The AVG selects an AVF to handle outgoing packets for the host and sends the host a reply message containing the vMAC of the AVF selected by the AVG. The host populates its ARP cache with this vMAC address. Thereafter, host addresses its outbound packets to the vMAC address in its ARP cache, thus sending these packets to the assigned AVF/router.

Hosts can be assigned vMAC addresses by random assignment, round robin assignment or by using another prescribed algorithm or methodology. In the event that an assigned AVF of the group fails, the outgoing communications that were to be handled by the failed AVF must be sent elsewhere. Upon failure of the originally assigned AVF, the failed AVF's vMAC address is reassigned to another AVF. Thereafter, outgoing packets from the host (and any other host(s) which send packets to the reassigned vMAC address) are routed instead to the new owner of that newly reassigned vMAC address. In the event that the AVG itself fails, additional steps are taken to appoint or elect a new AVG and ensure continuity in the load distribution function.

If, however, the failed gateway device was also providing translation services to the host using NAT, that translation database or other information is consequently lost or otherwise inaccessible to the AVF to which the failed AVF's vMAC address has been assigned. Therefore, due to the structure and operation of load sharing schemes such as Cisco's GLBP system, NAT (translation) services have not been provided simultaneously.

In view of the foregoing, it would be desirable to provide NAT services for communications from outside a local network while ensuring that redundant, load sharing gateway services are still available for the local network.

SUMMARY OF THE INVENTION

The present invention provides methods, apparatus, products, techniques and systems for providing gateway and NAT services to hosts on a local network. A redundancy group of gateway devices share responsibility for outgoing packets from users through the assignment of a virtual MAC address to each gateway device to which users are directed in response to an ARP request.

One aspect of the present invention is a method of providing gateway and NAT services in a load-sharing redundancy group comprising gateway devices, in which a pool of unique IP addresses is partitioned into address blocks, one of which is assigned to a gateway device. Using the unique IP addresses in its assigned address block, the gateway device translates a local IP address of a host to a unique IP address from that gateway device's assigned first address block and creates a mapping of the translation. The gateway device then notifies one or more other gateway devices in the redundancy group of the mapping. Each gateway device maintains a master mapping database which is updated whenever one of the gateway devices performs a translation. In the event that one of the gateway devices ceases forwarding of outgoing packets for a host using the gateway device's virtual MAC address, that virtual MAC address is re-assigned to an operating gateway device in the redundancy group to permit continued forwarding of the host's packets destined for outside networks.

Another aspect of the present invention pertains to a gateway device configured to provide gateway and NAT services to a host on a local network. The gateway device has one or more processors and a memory in communication with at least one of the processors. At least one of the processors and the memory is configured or designed to translate a local IP address of the host by mapping the local IP address to a unique IP address, which is one address contained in an address block of unique IP addresses. The gateway device is further configured to forward a packet destined for an outside network using the translated unique IP address and send an update containing the address translation to members of a redundancy group of which the gateway device is a member. The host uses a virtual address assigned to the gateway device in addressing the host's outgoing packets. This virtual address can be re-assigned to a different gateway device in the event that the original forwarding gateway device ceases forwarding the host's packets destined for outside networks.

One other aspect of the present invention is a system for providing gateway and NAT services to a host on a local network. The system has a load-sharing redundancy group that includes first and second gateway devices. Each gateway device has a re-assignable virtual address and an assigned address block that contains unique IP addresses. The first gateway device is configured to forward packets from the host to outside networks using a translated address, where the translated address is a mapping of a local IP address of the host to one of the first plurality of unique IP addresses. The first gateway device also is configured to send the mapping of the local IP address of the host to its translated unique IP address to the second gateway device. The first and second gateway devices each maintain a copy of a master mapping database. The first gateway device updates its copy of the master mapping database with the mapping it performs and the second gateway device updates its copy of the master mapping database with the mapping sent by the first gateway device. The re-assignable virtual addresses can be virtual MAC addresses. Moreover, the second gateway device can be configured to assume the first gateway device's re-assignable virtual address if the first gateway device ceases forwarding of packets from the host destined for an outside network. Other computer program products and related apparatus also are disclosed.

These and other features and advantages of the present invention will be presented in more detail in the following specification of the invention and the associated figures.

BRIEF DESCRIPTION OF THE DRAWINGS

The present invention may best be understood by reference to the following description taken in conjunction with the accompanying drawings in which.

DETAILED DESCRIPTION OF THE EMBODIMENTS

1. Definitions

Figure 1A:
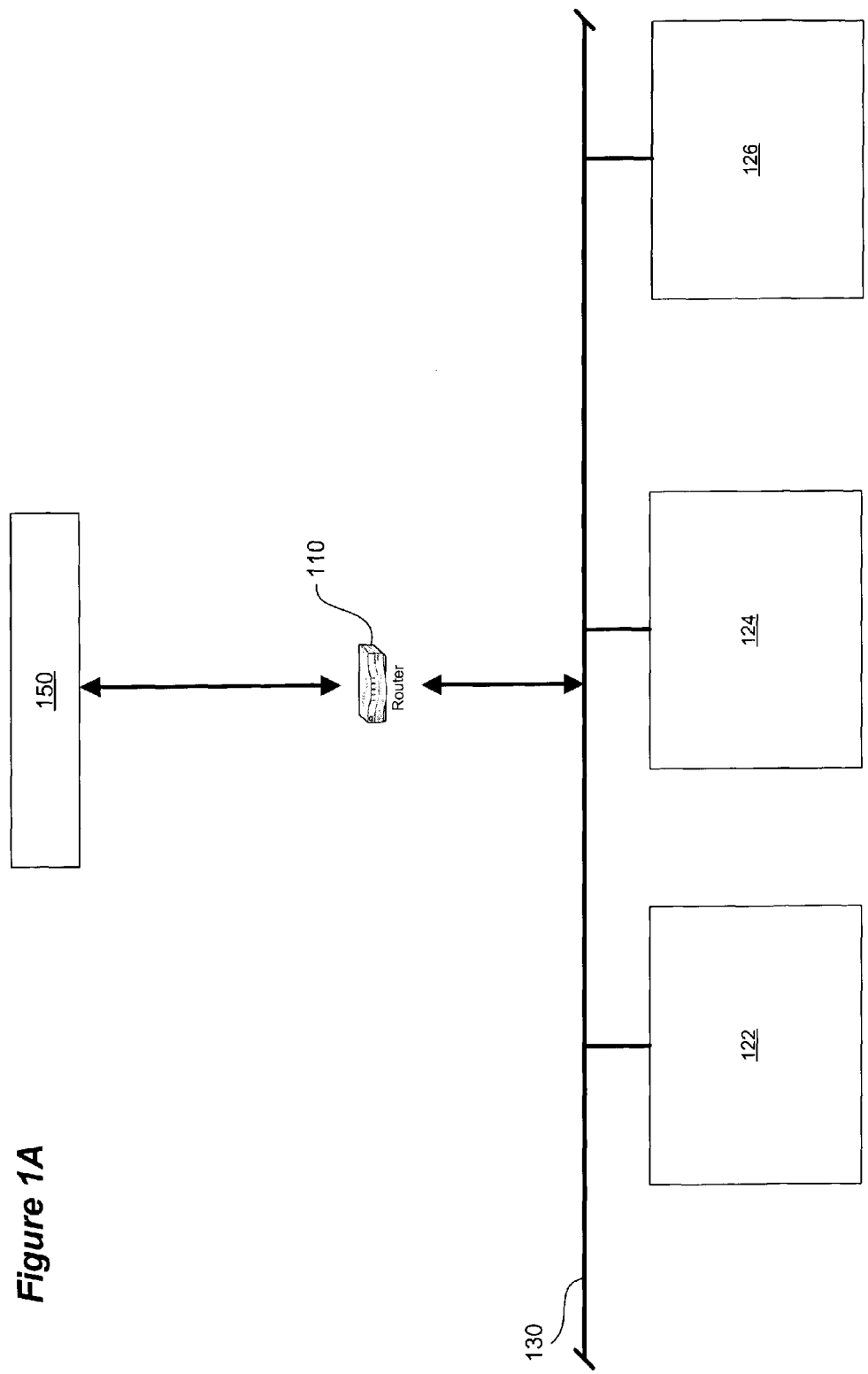
FIG. 1A is a schematic diagram of the logical structure a gateway service for hosts in a LAN.
Figure 1B:
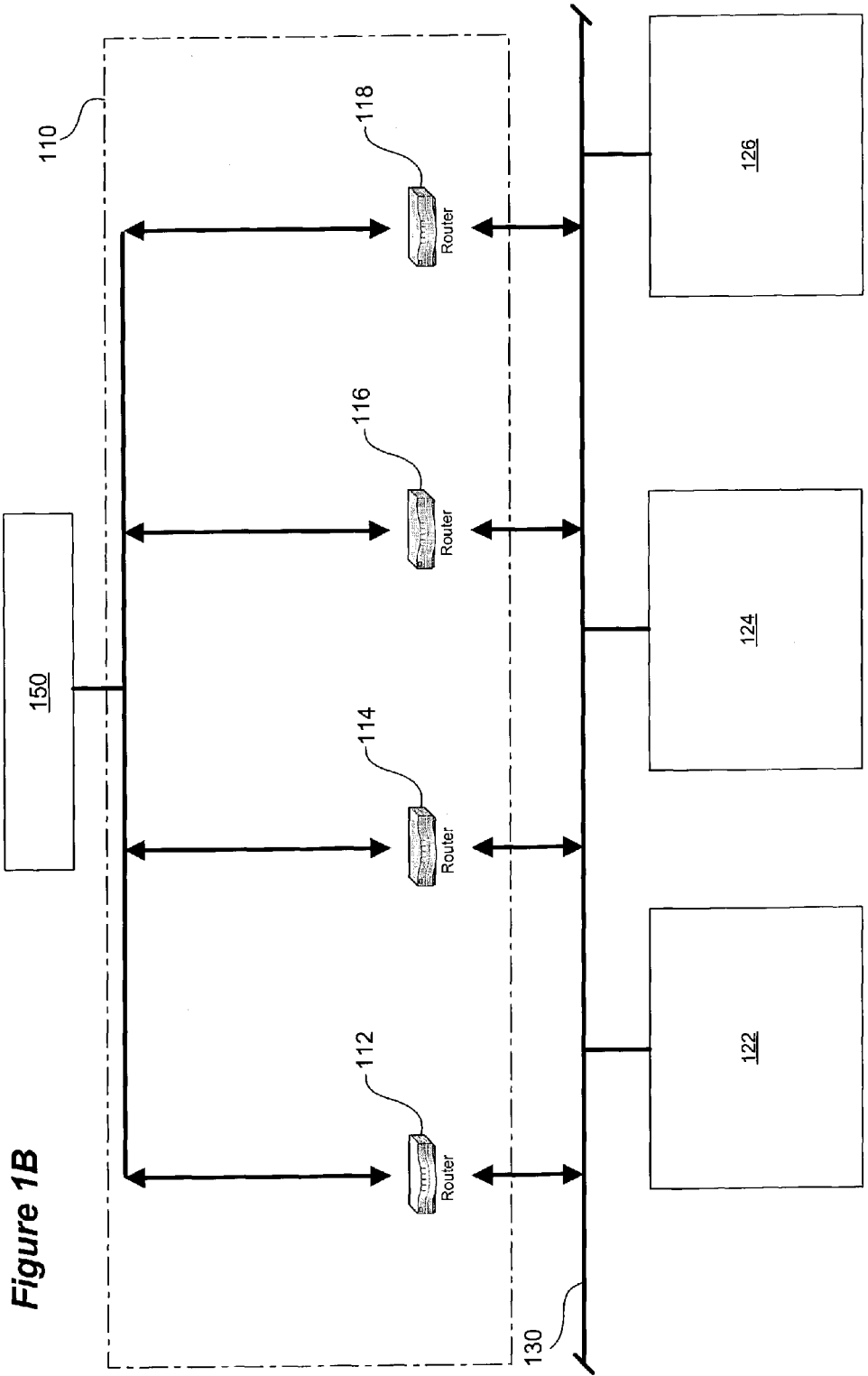
FIG. 1B is a schematic diagram of the physical structure of the gateway service shown in FIG. 1A in which multiple gateway devices are used in a redundancy group to provide resiliency.

Reference will now be made in detail to the preferred embodiment of the invention. An example of the preferred embodiment utilizing products, protocols, methods, systems and other technology developed, sold and/or used by Cisco Systems is illustrated in the accompanying drawings. While the invention will be described in conjunction with that preferred embodiment, it will be understood that it is not intended to limit the invention to one preferred embodiment or to its implementation solely in connection with Cisco products and systems. On the contrary, the following description is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

The following terms are used in the instant specification. Their definitions are provided to assist in understanding the preferred embodiments described herein, but do not necessarily limit the scope of the invention.

A "host" is a PC, or other arbitrary network entity residing on a LAN, that periodically communicates with network entities outside the LAN on which the host resides through a router or bridge. The term "user" may be used equivalently in this disclosure.

A "router" is a piece of hardware which operates at the network layer to direct packets between various LANs or WANs of a network. The network layer generally allows pairs of entities in a network to communicate with each other by finding a path through a series of connected nodes. Other terms that may be used in this disclosure include layer 3 switch, layer 3 device and gateway or gateway device which are not necessarily the same as a router, but which may function in the same place and manner as a router. Any and all of these terms are intended to be interpreted as broadly as possible, unless specifically defined more narrowly.

An "IP (internet protocol) address" is a network layer address for a device operating in the IP suite of protocols. The IP address is typically a 32 bit field, at least a portion of which contains information corresponding to its particular network segment. Thus, the IP address of a router may change depending upon its location in a network. An IP address that is referred to as "unique" may be globally unique or may be sufficiently unique for the uses for which it is intended (for example, in a limited network environment in which globally unique IP addresses are unnecessary, but in which local IP addresses used on a local network are not sufficiently unique).

A "MAC address" is a data link layer device address, defined by the IEEE 802 committee that deals with issues specific to a particular type of LAN. The types of LANs for which MAC (an acronym for Media Access Control) addresses are available include token ring, FDDI and Ethernet. A MAC address generally is intended to apply to a specific physical device no matter where it is plugged into the network. Thus, a MAC address generally is hardcoded into the device—on a router's ROM, for example. This should be distinguished from the case of a network layer address, described above, which changes depending upon where it is plugged into the network. Also, a real MAC address (such as a "burned in address" or BIA MAC address) can be distinguished from a "virtual address" (as defined below) which can include a virtual MAC address.

A "virtual address" is an address, typically (but not necessarily) shared by a group of real network entities, corresponding to a virtual entity. In the context of this invention, one real router from among two or more real routers emulates a virtual router by adopting the virtual address, and another entity (usually a host) is configured to send data packets to such virtual address, regardless of which real router is currently emulating the virtual router. In the preferred embodiments, the virtual addresses may encompass both MAC layer and network layer (IP) addresses. Usually, various members of the group each have the capability of adopting the virtual address(es) to emulate a virtual entity.

A "packet" is a collection of data and control information including source and destination node addresses, formatted for transmission from one node to another. In the context of this invention, it is important to note that hosts on one LAN send packets to hosts on another LAN through a router or bridge connecting the LANs.

"IP aliases" are the addresses that belong to a device, including the addresses that are configured on the device's interfaces and any addresses not configured on the interfaces, but which are owned by the device.

2. Overview

The present invention uses a load-sharing system or protocol in connection with NAT services to permit distributed forwarding of packets that are sent from hosts requiring unique IP addresses and which are subsequently sent across multiple gateway devices acting as one or more virtual gateways for communications outside a local subnet. A distributed NAT database (translation and context information) is maintained in a group of routers that are providing this redundant, load-sharing virtual router service. One or more embodiments of the present invention will be explained using Cisco's GLBP as a non-limiting example of a load-sharing protocol for the redundancy group. Those skilled in the art will appreciate that other similar methods, apparatus, etc. can be used so long as they allow packets destined to a single virtual between or other IP address to be forwarded by multiple actual gateway devices. As used herein, the phrase "load-sharing redundancy group" means any apparatus, method, etc. that allows packets destined for a single IP address to be forwarded by multiple gateway devices which also work together to provide failover services in the event of a gateway device failure.

Figure 2:
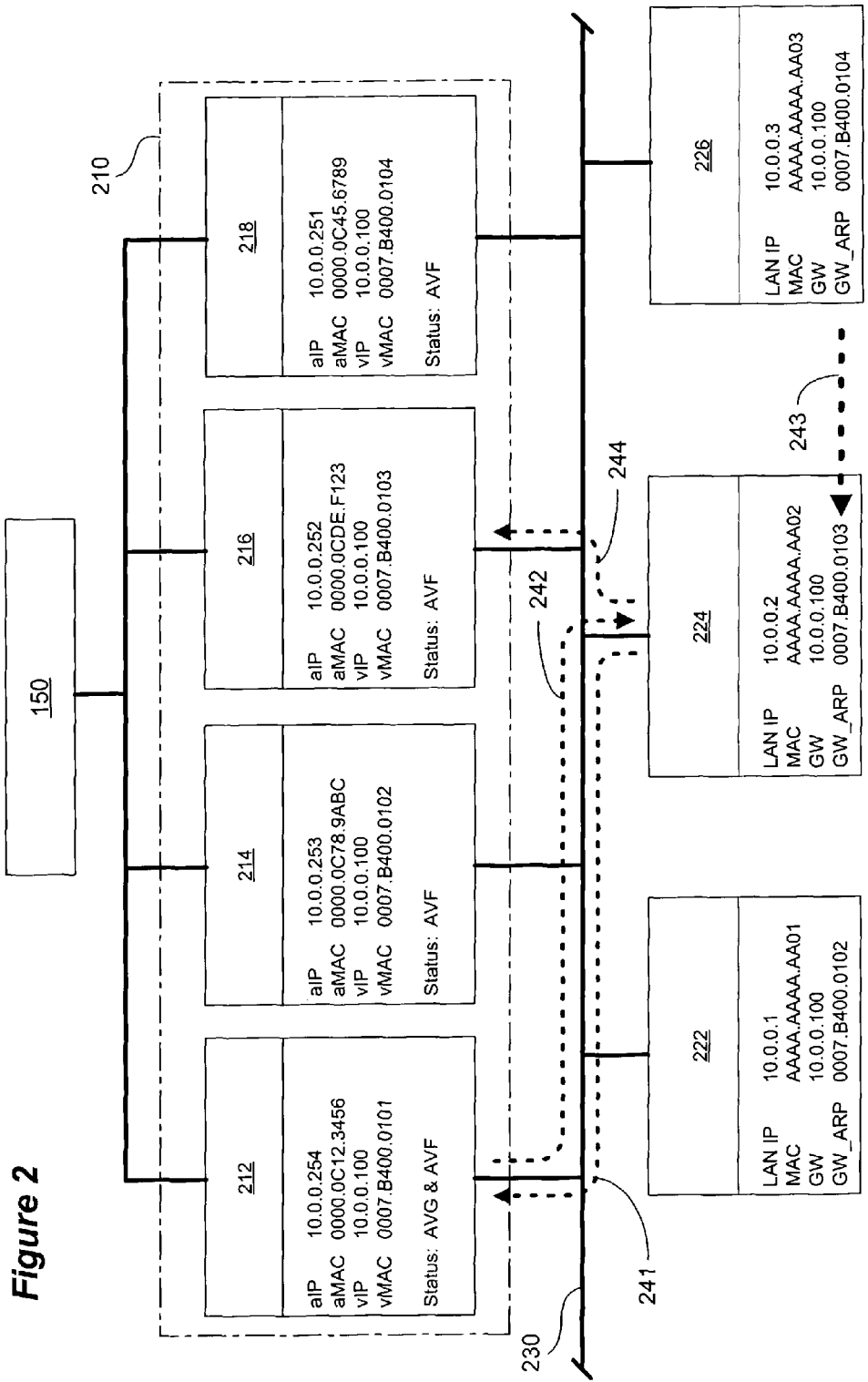
FIG. 2 is a schematic diagram of a virtual router in which several routers are available to both direct traffic outside the local network and also to provide translation services using a distributed NAT database available to the members of the redundancy group, using the present invention.

In one embodiment of the present invention shown in FIG. 2, the redundancy group is a GLBP group using routers as gateway devices. Each router in the GLBP group is an AVF and is assigned a virtual MAC address. In prior systems, NAT typically has been implemented by an individual address assigning/translation device using a pool of unique IP addresses that can be temporarily assigned to the non-unique local addresses used by hosts in a LAN. In such prior systems, the assigning device performing translations maps hosts' local addresses to available unique addresses, and also maintains a database of the mappings.

In the embodiment of the present invention shown in FIG. 2, the AVG 212 maintains the master NAT database. The NAT process in each router can be notified which router in the GLBP group is the AVG for that group using services and/or protocols known to those skilled in the art. When a NAT process learns of a new AVG then it will register with the NAT process in the AVG and will receive a copy of the master NAT database in return. In another embodiment of the present invention, the NAT database is maintained by each gateway device separately, so that each router or other device as its own "copy" of the gateway's NAT mappings.

As seen in FIG. 2, virtual gateway 210 is made up of multiple actual gateway device routers 212, 214, 216 and 218. Each gateway device has an aIP address, an aMAC address and re-assignable virtual MAC address (also referred to as a vMAC address) assigned to it. All gateway devices in redundancy group 210 share vIP address 10.0.0.100. As illustrated, gateway device 212 uses actual IP address 10.0.0.254, actual MAC address 0000.0C12.3456 and vMAC address 0007.B400.0101; gateway device 216 uses actual IP address 10.0.0.252, actual MAC address 0000.0CDE.F123 and vMAC address 0007.B400.0103. In this embodiment of the present invention, the last 4 digits of the vMAC address identify the redundancy group (for example, 01xx in FIG. 2) and the forwarding gateway device (for example, xx01, xx02, xx03 or xx04 in FIG. 2). Other addressing schemes may be used and such variations will be appreciated by the those skilled in the art after reviewing the present disclosure.

The hosts on the local subnet which virtual router group 210 serves are hosts 222, 224 and 226. Each host has its own non-unique IP address (which is unique on the subnet) and a MAC address. As with prior GLBP systems, the hosts have been pre-programmed in any suitable manner with the gateway address of the virtual router group, in this case 10.0.0.100. For example, host 224 has a LAN IP address of 10.0.0.2 and a MAC address of AAAA.AAAA.AA02. The ARP resolution protocol and apparatus is similar to a standard GLBP system. When a host 224 sends an ARP request, indicated by arrow step 241, to the gateway IP address (for example, 10.0.0.10), the GLBP gateway device 212 sends to the requesting host 224, at step 242, the vMAC address of a gateway device. At step 243, the host 224 caches this vMAC address and then, at step 244, sends packets destined for an outside network outside the LAN to the gateway device 216 then possessing the cached vMAC address (here, 0007.B400.0103).

Figure 3:
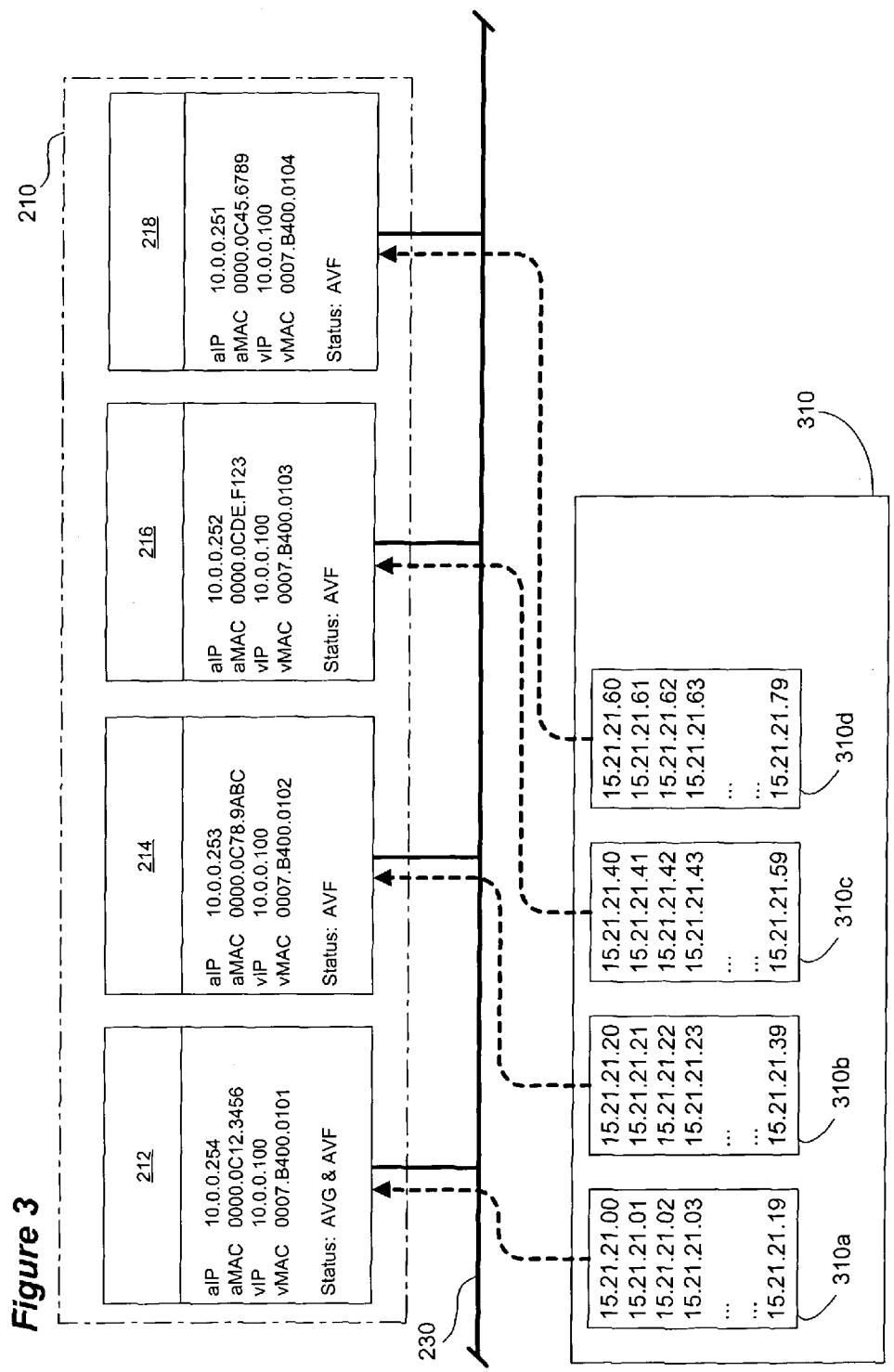
FIG. 3 shows assignment of address blocks to individual gateway devices after partitioning of a pool of unique IP addresses for use in NAT services.

As seen in FIG. 3, the entire pool 310 of available globally unique IP addresses (and/or other addresses to be used for translation purposes) is partitioned (for example, by or under the control of the GLBP gateway device) into address blocks 310a, 310b, 310c and 310d. In the example of FIG. 3, 80 unique IP addresses (15.21.21.00 through 15.21.21.79) are available from general address pool 310 to be used by the redundancy group and its hosts for NAT services. One or more blocks of addresses are assigned to each individual AVF 212, 214, 216 and 218. In the example illustrated in FIG. 3, block 310a (containing addresses 15.21.21.00 through 15.21.21.19) is assigned to gateway device 212, block 310b (containing addresses 15.21.21.20 through 15.21.21.39) is assigned to gateway device 214, block 310c (containing addresses 15.21.21.40 through 15.21.21.59) is assigned to gateway device 216 and block 310d (containing addresses 15.21.21.60 through 15.21.21.79) is assigned to gateway device 218.

Once the addresses have been allocated, gateway devices can start providing NAT services to hosts on the subnet. Hosts are assigned to AVFs in accordance with a prescribed algorithm or methodology, which will be discussed in more detail below. In the embodiment of the present invention shown in FIG. 4, host 224, using a methodology such as the one illustrated in FIG. 2, has ARPed for and received the MAC address (vMAC address 0007.B400.0103) of the gateway device (router 216) to which host 224 should send outgoing packets.

When host 224 sends a packet to router 216, at step 421, the packet initially goes to the translation system 400 of router 216 to, among other things, evaluate the need for translation services. Router 216 determines that translation is required since the LAN IP address (10.0.0.2) of host 224 is non-unique and the packet is destined for an outside network or other outside destination 150. Therefore, at step 422, system 400 obtains an available address from its allocated addresses in block 310c (here, address 15.21.21.40 is selected). System 400 creates a mapping at step 423 showing the binding of local IP address 10.0.0.2 to globally unique IP address 15.21.21.40. Once this mapping has taken place, router 216 can prepare the packet for transmission in any appropriate way(s), as will be appreciated by those skilled in the art, and then, at step 424, send the packet outside the LAN to its destination 150.

Figure 4:
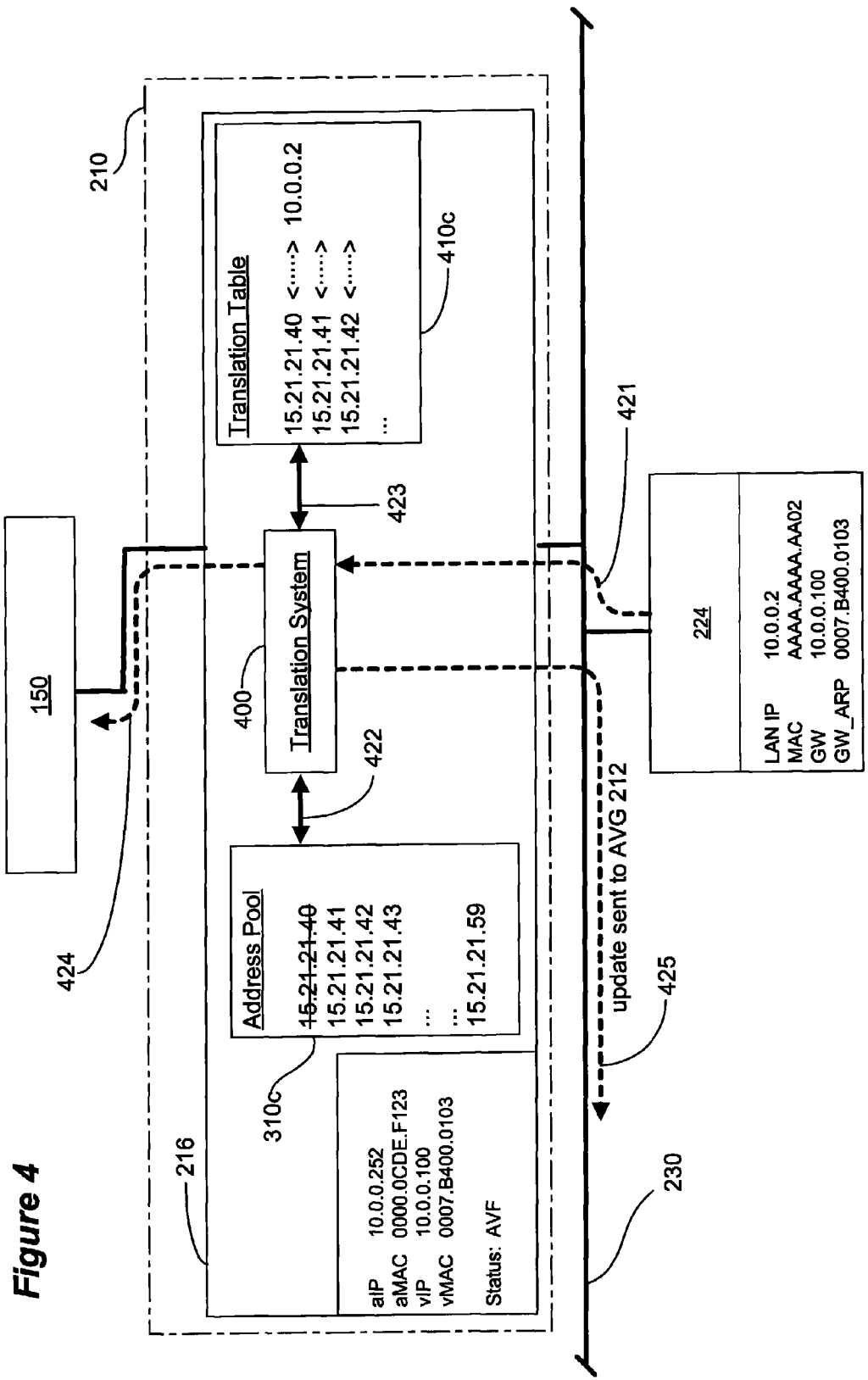
FIG. 4 shows translation and updating of the redundancy group according to one embodiment of the present invention.

In the embodiment of the present invention shown in FIG. 4, the AVG maintains the master NAT mapping database for the redundancy group. Therefore, at step 425, the system 400 of AVF/router 216 sends AVG/router 212 (the AVG in this example) the update for the master database. In other embodiments of the present invention, the AVFs may only send these updates to other AVFs periodically, rather than updating the master NAT mapping database every time a translation mapping is created.

The AVG can then multicast a delta (for example, the most current version) of the master NAT mapping database to all members of the redundancy group, each of which will acknowledge receipt of the update. If appropriate acknowledgment is not received from more than one member of the redundancy group, then the update can be multicast again. If appropriate acknowledgment is not received from only one member of the redundancy group, then the update can be unicast to that router.

In other embodiments of the present invention, AVF/router 216 could send its new mapping(s) to all of the members of the redundancy group to allow them to update their own copies of the master mapping database. This would require each AVF that updates its mapping database corresponding to its assigned address pool block to send these messages and properly perform acknowledgment checks from each of the other redundancy group members after multicasting each update. Other methods and mechanisms for maintaining this distributed database information will be apparent to those skilled in the art after reading the present disclosure.

Figure 5:
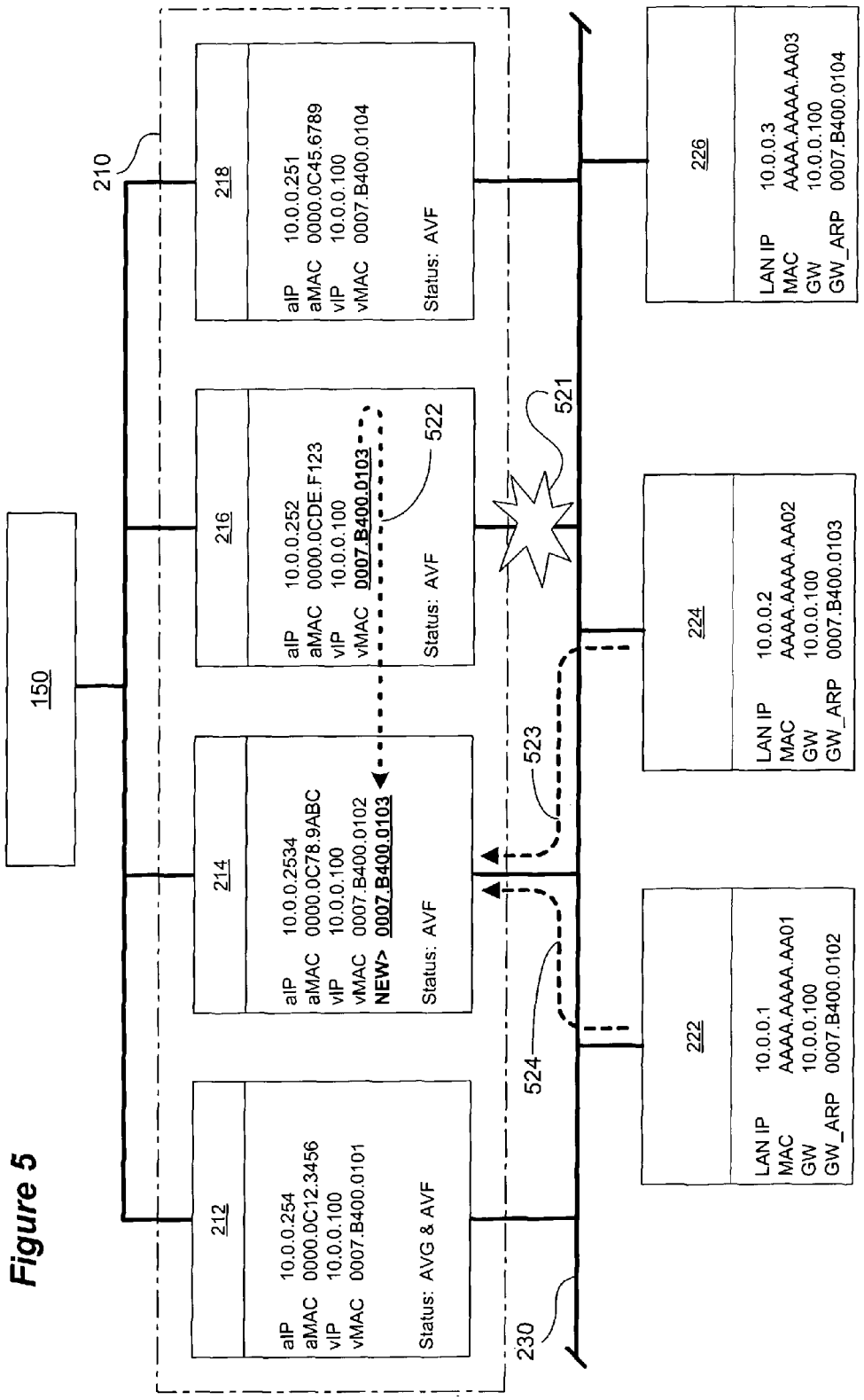
FIG. 5 shows failure of a redundancy group member and NAT database availability and re-assignment of the failed gateway device's vMAC address using one embodiment of the present invention.

When an AVF/router fails, as shown in FIG. 5, responsibility for traffic sent to and by its re-assignable vMAC address (and any assigned address block(s)) is assumed by and/or assigned to another member of the redundancy group. In FIG. 5, AVF/router 216 fails at point 521 and traffic from host 224, which is using vMAC address 0007.B400.0103 as its destination for outgoing packets, can no longer use AVF/router 216. That outgoing traffic must be sent instead to a viable redundancy group member. The re-assignment of the failed gateway device's vMAC address and address block for translations is performed as it would be in standard load-sharing operation, typically by the AVG of the group. In the situation illustrated in FIG. 5, the vMAC address and assigned address block of failed AVF/router 216 are assigned at step 522 to AVF/router 214. This switch-over to router 214 is transparent to host 224 and any parties sending communications/packets to host 224 from outside the LAN.

Because AVF/router 214 has a copy of the master NAT database, including the mappings assigned and maintained by failed AVF/router 216, packet transmission and NAT services are not interrupted. Traffic sent at step 523 to vMAC address 0007.B400.0103 now arrives at AVF/router 214 rather than failed AVF/router 216. Since AVF/router also has been assigned vMAC address 0007.B400.0102, traffic addressed to that MAC address, such as traffic at step 524 from host 222, still is forwarded by AVF/router 214.

Cisco's GLBP protocol and other load-sharing protocols that can use the present invention use various load-sharing algorithms to decide which vMAC address to send in response to an ARP for the virtual IP address of the redundancy group. When the redundancy group is providing NAT services and/or other redundancy services, and load sharing algorithm can be used. One example of such an algorithm is a host-dependent load sharing algorithm, where a hash of the source host's MAC address (which the AVG device receives with the host's ARP request) modulo'd with the current number of AVFs. Thus, for a set number of AVFs, each host will be guaranteed receipt of the same vMAC address each time it ARPs for the virtual IP address of the redundancy group. This ensures that the router or other gateway device, containing the same AVF instance, is implementing NAT translations for each flow.

NAT can be bound to a particular load-sharing group that is configured using the command of Cisco's GLBP protocol. The AVG can then maintain the master NAT database. As noted above, an appropriate service or protocol can then be used to notify the NAT process in each router of the identity of the AVG for that group. When a NAT process learns of a new AVG, then it will register with the NAT process in the AVG and will receive a copy of the master NAT database in return.

Those skilled in the art will appreciate that the selection of a redundancy and/or NAT protocol for use in a given setting may be influenced by various considerations. Regardless of the protocol(s) selected, however, the present invention can be implemented in a virtual router group or other redundancy group by appropriate selection of the redundancy protocol and the NAT requirements of the system so that the desired performance can be obtained.

Generally, the techniques for implementing the present invention may be implemented on software and/or hardware. For example, these techniques can be implemented in an operating system kernel, in a separate user process, in a library package bound into network applications, on a specially constructed machine, or on a network interface card. In a specific embodiment of this invention, the techniques of the present invention are implemented in software such as an operating system or in an application running on an operating system.

A software or software/hardware hybrid packet processing system of this invention is preferably implemented on a general-purpose programmable machine selectively activated or reconfigured by a computer program stored in memory. Such programmable machine may be a network device designed to handle network traffic. Such network devices typically have multiple network interfaces including frame relay and ISDN interfaces, for example. Specific examples of such network devices include routers and switches. For example, the packet processing systems of this invention may be specially configured routers such as specially configured router models 1600, 2500, 2600, 3600, 4500, 4700, 7200, 7500, and 12000 available from Cisco Systems, Inc. of San Jose, Calif. A general architecture for some of these machines will appear from the description given below. In an alternative embodiment, the system may be implemented on a general-purpose network host machine such as a personal computer or workstation. Further, the invention may be at least partially implemented on a card (for example, an interface card) for a network device or a general-purpose computing device.

Figure 6:
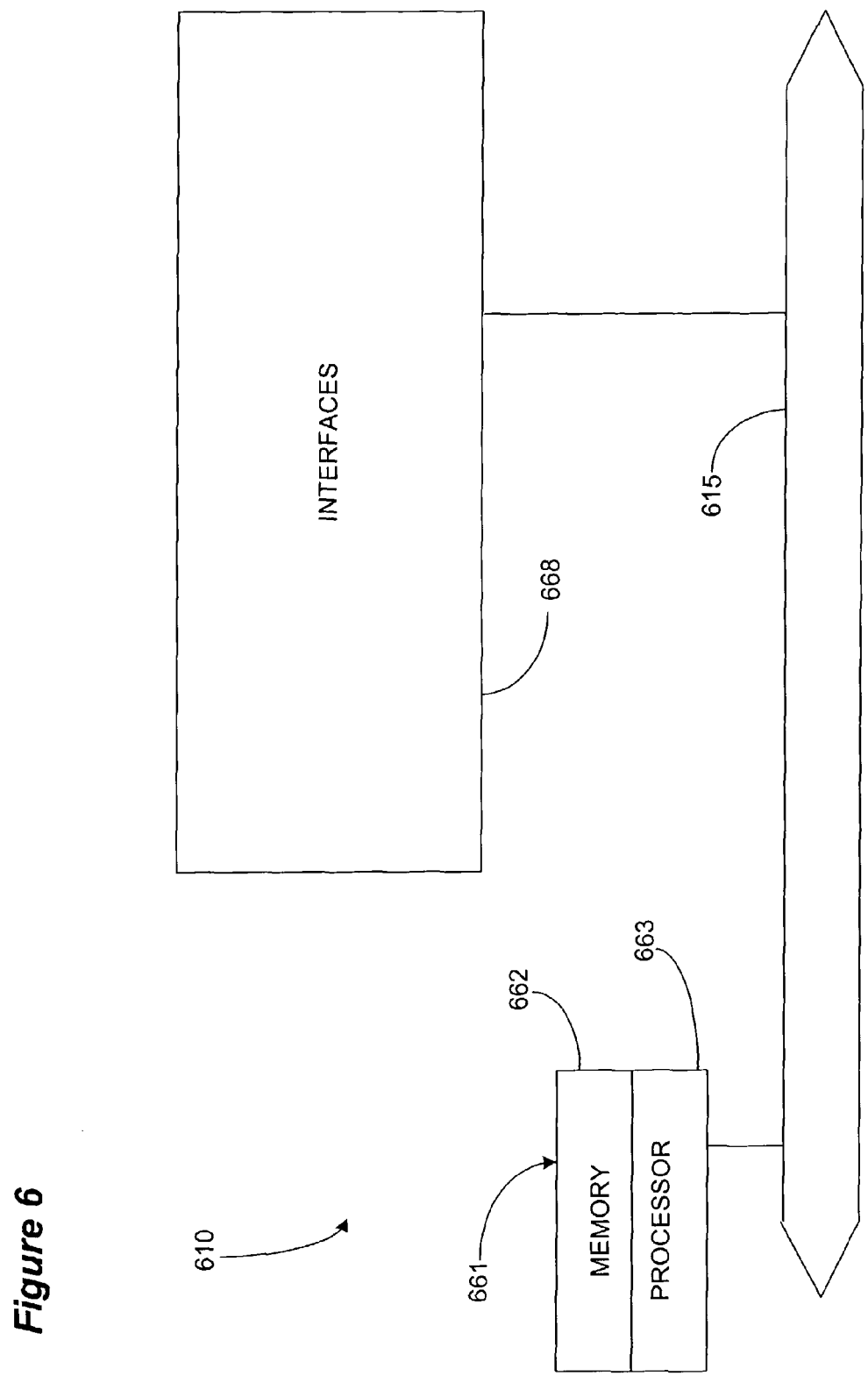
FIG. 6 is a diagrammatic representation of a router in which embodiments of the present invention may be implemented.

Referring now to FIG. 6, a router 610 suitable for implementing the present invention includes a master central processing unit (CPU) 662, interfaces 668, and a bus 615 (e.g., a PCI bus). When acting under the control of appropriate software or firmware, the CPU 662 is responsible for such router tasks as routing table computations and network management. It may also be responsible for network address translation, virtual gateway operations, etc. It preferably accomplishes all these functions under the control of software including an operating system (e.g., the Internet Operating System (IOS®) of Cisco Systems, Inc.) and any appropriate applications software. CPU 662 may include one or more processors 663 such as a processor from the Motorola family of microprocessors or the MIPS family of microprocessors. In an alternative embodiment, processor 663 is specially designed hardware for controlling the operations of router 610. In a preferred embodiment, a memory 661 (such as non-volatile RAM and/or ROM) also forms part of CPU 662. However, there are many different ways in which memory could be coupled to the system.

The interfaces 668 are typically provided as interface cards (sometimes referred to as "line cards"). Generally, they control the sending and receiving of data packets over the network and sometimes support other peripherals used with the router 610. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 662 to efficiently perform routing computations, network diagnostics, security functions, etc.

Although the system shown in FIG. 6 is one preferred router of the present invention, it is by no means the only router architecture on which the present invention can be implemented. For example, an architecture having a single processor that handles communications as well as routing computations, etc. is often used. Further, other types of interfaces and media could also be used with the router.

Regardless of network device's configuration, it may employ one or more memories or memory modules (including memory 661) configured to store program instructions for the general-purpose network operations and address translation operations described herein. The program instructions may control the operation of an operating system and/or one or more applications, for example. The memory or memories may also be configured to store relevant state information, data structures, etc., such as the address translation lists (e.g., tables) described herein.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as optical disks; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents, whether foreseeable or unforeseeable now or in the future.

What is claimed is:

1. A method of providing gateway and NAT services in a redundancy group comprising a first gateway device and a second gateway device, the method comprising:

partitioning a pool of unique IP addresses into a plurality of address blocks, including a first address block and a second address block, wherein the first address block contains at least one unique IP address from the pool;

assigning the first address block to the first gateway device and the second address block to the second gateway device;

in the first gateway device, creating a mapping of a unique IP address in the first address block to a local address of a host serviced by the first gateway device; and notifying the second gateway device of the mapping by sending a communication containing the mapping by the first gateway device to the second gateway device, wherein the first and second gateway devices are configured to perform NAT using the mapping;
assigning the host to use the first gateway device to forward a packet from the host destined for a network outside a local network to which the host is coupled;
assigning a virtual address to the first gateway device;
wherein assigning the host to use the first gateway device comprises instructing the host to send the packet destined for the network outside the local network to the virtual address assigned to the first gateway device;
the first gateway device ceasing forwarding of packets from the local network to outside networks; and
transferring assignment of the virtual address to the second gateway device.

2. The method of claim 1 wherein the redundancy group implements gateway load balancing protocol (GLBP).

3. The method of claim 1, further comprising:
updating a mapping database residing on the second gateway device with the mapping, wherein the second gateway device is an active virtual gateway device and the first gateway device is an active virtual forwarder device.

4. The method of claim 1, wherein the second gateway device is one of one or more active virtual forwarder devices in the redundancy group, wherein a mapping database residing on the second gateway device is updated with the mapping.

5. The method of claim 4, wherein the first gateway device is another one of the one or more active virtual forwarder devices in the redundancy group.

6. The method of claim 4, wherein the first gateway device is an active virtual gateway device.

7. The method of claim 1, further comprising:
performing network address translation by translating between the unique IP address in the first address block and the local address of the host.

8. A gateway device configured to implement the method of claim 1.

9. A method of providing gateway and NAT services in a redundancy group connected to a local network and having a plurality of redundancy group members comprising an active virtual gateway device (AVG device), and further comprising an active virtual forwarding device (AVF device), the method comprising:
partitioning a pool of unique IP addresses into a plurality of address blocks, including a first address block and a second address block, wherein the first address block contains at least one unique IP address from the pool;
creating a master mapping database containing any NAT mappings performed by the redundancy group at the AVG device;
assigning the first address block to the AVF device and the second address block to the AVG device;
assigning a host to the AVF device to forward a packet from the host to a network outside the local network, wherein the host uses a local IP address on the local network;
creating a mapping of a unique IP address in the first address block to the local IP address of the host;
updating the master mapping database at the AVG device by adding the mapping to the master mapping database, wherein the mapping enables NAT to be performed between the local IP address of the host and the unique IP address in the first address block, wherein the plurality of redundancy group members are configured to perform NAT using mappings;
wherein the step of assigning the host to the AVF device comprises the AVG device forwarding a virtual MAC address assigned to the AVF device to the host in response to an ARP request from the host;
the AVF device ceasing forwarding of packets from the local network to outside networks; and
transferring assignment of the virtual MAC address to a forwarding AVF device.

10. The method of claim 9, the method further comprising:
sending the mapping by the AVG device to the AVF device in the redundancy group, thereby enabling the AVF device to perform NAT using the mapping.

11. The method of claim 9 wherein the redundancy group is a gateway load balancing protocol (GLBP) group.

12. The method of claim 9 wherein each member of the redundancy group maintains a copy of the master mapping database, the method further comprising:
sending a communication containing the mapping from the AVF device to at least one other AVF device of the redundancy group, thereby enabling the at least one AVF device of the redundancy group to update its copy of the master mapping database to enable NAT to be performed using the mapping.

13. The method of claim 9 wherein the AVG device maintains the master mapping database;
further wherein updating the master mapping database by adding the mapping to the master mapping database comprises:
receiving a communication containing the mapping by the AVG device from the AVF device.

14. A gateway device configured to implement the method of claim 9.

15. A non-transitory computer-readable storage medium storing thereon computer-readable instructions specifying a method of providing gateway and NAT services in a redundancy group comprising a first gateway device and a second gateway device, the method comprising:
partitioning a pool of unique IP addresses into a plurality of address blocks, including a first address block and a second address block, wherein the first address block contains at least one unique IP address from the pool;
assigning the first address block to the first gateway device and the second address block to the second gateway device;
in the first gateway device, creating a mapping of a unique IP address in the first address block to a local address of a host serviced by the first gateway device;
notifying the second gateway device of the mapping by sending a communication containing the mapping by the first gateway device to the second gateway device, wherein the first and second gateway devices are configured to perform NAT using the mapping;
assigning the host to use the first gateway device to forward a packet from the host destined for a network outside a local network to which the host is coupled;
wherein assigning the host to use the first gateway device comprises instructing the host to send the packet destined for the network outside the local network to a virtual address associated with the first gateway device;
the first gateway device ceasing forwarding of packets from the local network to outside networks; and
transferring assignment of the virtual address to the second gateway device.

16. The non-transitory computer-readable storage medium of claim 15 wherein the redundancy group implements gateway load balancing protocol (GLBP).

17. The non-transitory computer-readable storage medium of claim 15, the method further comprising:

updating a master mapping database residing on the second gateway device with the mapping, wherein the second gateway device is an active virtual gateway device and the first gateway device is an active virtual forwarder device.

18. The non-transitory computer-readable storage medium of claim 15, wherein the second gateway device is one of one or more active virtual forwarder devices in the redundancy group, wherein a mapping database residing on the second gateway device is updated with the mapping.

19. The non-transitory computer-readable storage medium of claim 18, wherein the first gateway device is another one of the one or more active virtual forwarder devices in the redundancy group.

20. The non-transitory computer-readable storage medium of claim 18, wherein the first gateway device is an active virtual gateway device.

21. The non-transitory computer-readable storage medium of claim 15, the method further comprising:
performing network address translation by translating between the unique IP address in the first address block and the local address of the host.

22. An apparatus for providing gateway and NAT services in a redundancy group comprising a first gateway device and a second gateway device, the apparatus comprising:
means for partitioning a pool of unique IP addresses into a plurality of address blocks, including a first address block and a second address block, wherein the first address block contains at least one unique IP address from the pool;
means for assigning the first address block to the first gateway device and the second address block to the second gateway device;
means for, in the first gateway device, creating a mapping of a unique IP address in the first address block to a local address of a host serviced by the first gateway device; and
means for notifying the second gateway device of the mapping by sending a communication containing the mapping to the second gateway device;
means for performing network address translation using the mapping such that translation between the local address of the host and the unique IP address of the first address block is performed;
means for assigning a host on a local network to use the first gateway device to forward a packet from the host destined for a network outside the local network, wherein the means for assigning the host to use the first gateway device comprises means for instructing the host to send the packet destined for the outside network to a virtual address assigned to the first gateway device; and
means for transferring assignment of the virtual address to the second gateway device after the first gateway device has ceased forwarding packets from the local network to outside networks.

23. A gateway device configured to provide gateway and NAT services to a host on a local network, the gateway device comprising:
one or more processors;
a memory in communication with at least one of the processors, wherein at least one of the processors or the memory is configured or designed to:
create a mapping of a unique IP address to a local address of the host, wherein the unique IP address is one address contained in an address block containing unique IP addresses obtained from an entire pool of available unique IP addresses partitioned into multiple address blocks for multiple gateway devices;
forward a packet destined for an outside network using the mapping by translating between the unique IP address and the local address of the host; and
send the mapping to members of a redundancy group of which the gateway device is a member, thereby enabling the members of the redundancy group to perform NAT using the mapping;
wherein at least one of the processors or the memory is configured or designed to utilize a first re-assignable virtual address to which the host addresses the packet destined for an outside network,
wherein at least one of the processors or the memory is configured or designed to assume a second re-assignable virtual address formerly used by another redundancy group member that is no longer forwarding packets to outside networks.

24. The gateway device of claim 23 wherein the first virtual address is a first virtual MAC address.

25. The gateway device of claim 23 wherein at least one of the processors or the memory is configured or designed to maintain a master mapping database that contains mappings of local IP addresses to unique IP addresses for all members of the redundancy group.

26. The gateway device of claim 23 wherein the redundancy group is a load-sharing redundancy group.

27. A gateway device configured to provide gateway and NAT services, the gateway device comprising:
one or more processors;
a memory in communication with at least one of the processors;
an address block containing a plurality of unique IP addresses from an entire pool of available unique IP addresses partitioned into multiple address blocks for multiple gateway devices; and
a first re-assignable virtual address;
wherein at least one of the processors or the memory is configured or designed to:
create a mapping of a unique IP address from the address block to a local IP address of a host on a local network;
forward a packet from the host destined for an outside network using the mapping; and
send the mapping to members of a redundancy group of which the gateway device is a member, wherein the members of the redundancy group are configured to perform network address translation using the mapping such that translation between the unique IP address from the address block and the local IP address of the host on the local network is performed;
wherein the first re-assignable virtual address is provided to the host in response to an ARP request from the host,
wherein at least one of the processors or the memory is configured or designed to assume a second re-assignable virtual address formerly used by another redundancy group member that is no longer forwarding packets to outside networks.

28. The gateway device of claim 27 wherein the first re-assignable virtual address is a first virtual MAC address.

29. The gateway device of claim 27 wherein at least one of the processors or the memory is configured or designed to maintain a master mapping database that contains mappings of local IP addresses to unique IP addresses for all members of the redundancy group.

30. A system for providing gateway and NAT services to a host on a local network, the system comprising a load-sharing redundancy group comprising:

a first gateway device having a first re-assignable virtual address and a first address block containing a first plurality of unique IP addresses;

a second gateway device connected to the first gateway device, the second gateway device having a second re-assignable virtual address and a second address block containing a second plurality of unique IP addresses for mapping to local addresses of hosts serviced by the second gateway device;

wherein the first gateway device is configured to map one of the first plurality of unique IP addresses to a local IP address of the host, wherein the first gateway device is configured to send the mapping to the second gateway device, wherein the first gateway device and the second gateway device are members of the load-sharing redundancy group;

wherein the members of the load-sharing redundancy group are configured to perform network address translation using the mapping such that translation between the unique IP address from the address block and the local IP address of the host on the local network is performed;

wherein the second gateway device is configured to assume the first re-assignable virtual address if the first gateway device ceases forwarding of packets from the host destined for an outside network.

31. The system of claim 30 wherein the first gateway device and second gateway device each maintain a mapping database; further wherein the first gateway device updates its master mapping database with the mapping; and further wherein the second gateway device updates its mapping database with the mapping sent by the first gateway device.

32. The system of claim 30 wherein the first re-assignable virtual address is a first virtual MAC address and further wherein the second re-assignable virtual address is a second virtual MAC address.

33. The system as recited in claim 30, wherein the first gateway device is an AVF device in the load-sharing redundancy group and the second gateway device is an AVG device in the load-sharing redundancy group.

34. The system as recited in claim 30, wherein the first gateway device is an AVG device in the load-sharing redundancy group and the second gateway device is an AVF device in the load-sharing redundancy group.

35. The system as recited in claim 30, wherein the load-sharing redundancy group includes an AVG device and one or more AVF devices, and wherein the first gateway device is one of the AVF devices in the load-sharing redundancy group and the second gateway device is another one of the AVF devices in the load-sharing redundancy group.

36. The gateway device as recited in claim 27, wherein the load-sharing redundancy group includes an AVG device and one or more AVF devices, wherein the gateway device is the AVG device.

37. The gateway device as recited in claim 27, wherein the load-sharing redundancy group includes an AVG device and one or more AVF devices, wherein the gateway device is one of the one or more AVF devices.

38. The gateway device as recited in claim 23, wherein the load-sharing redundancy group includes an AVG device and one or more AVF devices, wherein the gateway device is the AVG device.

39. The gateway device as recited in claim 23, wherein the load-sharing redundancy group includes an AVG device and one or more AVF devices, wherein the gateway device is one of the one or more AVF devices.

40. The method of claim 1, further comprising:
performing network address translation in the first gateway device by translating the local address of the host to the unique IP address in the first address block.

41. The method as recited in claim 7, wherein performing network address translation is performed by the first gateway device.

42. The method as recited in claim 7, wherein performing network address translation is performed by the second gateway device.

43. The method as recited in claim 7, wherein performing network address translation is performed by a member of the load sharing redundancy group that receives the mapping from the second gateway device.

44. The method as recited in claim 1, wherein the redundancy group is a load sharing redundancy group.

45. The method as recited in claim 10, further comprising:
performing NAT using the mapping by translating between the local IP address of the host and the unique IP address in the first address block.

46. The method as recited in claim 45, wherein performing NAT comprises:
performing NAT by the AVF device.

* * * * *